United States Patent [19]

Yassaie et al.

[11] Patent Number: 4,835,725
[45] Date of Patent: May 30, 1989

[54] APPARATUS AND METHOD FOR MULTISTAGE ELECTRICAL SIGNAL PROCESSING

[75] Inventors: Mohamad H. Yassaie, Portishead; Anthony D. King-Smith, Dursley; Clive M. Dyson, Yate, all of England

[73] Assignee: INMOS Ltd., Bristol, England

[21] Appl. No.: 52,248

[22] Filed: May 19, 1987

[30] Foreign Application Priority Data

May 22, 1986 [GB] United Kingdom ............... 8612455

[51] Int. Cl.⁴ ............................................. G06F 7/38
[52] U.S. Cl. .............................. 364/736; 364/724.16
[58] Field of Search ............................. 364/736, 724

[56] References Cited

U.S. PATENT DOCUMENTS 4,718,104  1/1988  Anderson ............................. 382/41

FOREIGN PATENT DOCUMENTS

EP201281  11/1986  European Pat. Off. ........... 364/724

Primary Examiner—Gary V. Harkcom
Assistant Examiner—Tan V. Mai
Attorney, Agent, or Firm—Edward D. Manzo

[57] ABSTRACT

A cascaded array of devices, each having electrical signal processing elements arranged to process simultaneously the same input data, is provided with inter-device connections including signal delay so that an intermediate result of processing by a second device is combined with an output which was derived from a first device at a time related to that at which input data was input to the second device for use in forming its intermediate result.

19 Claims, 4 Drawing Sheets

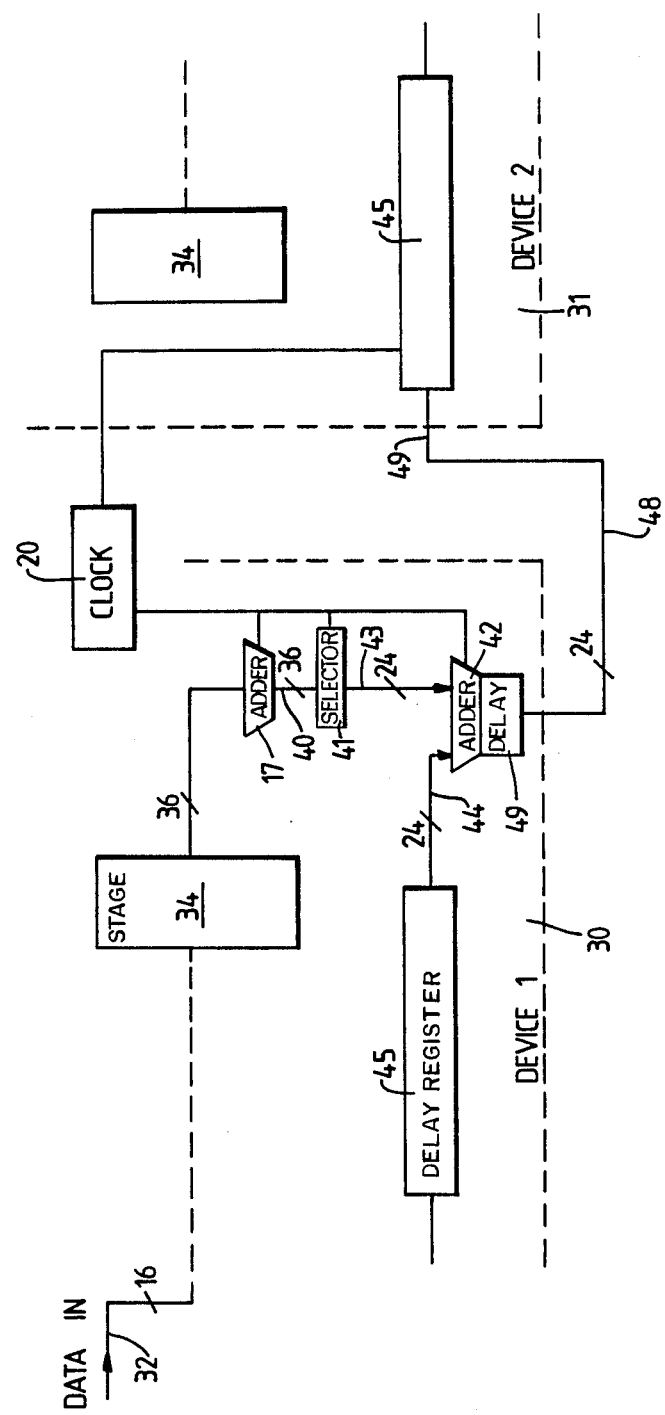

APPARATUS AND METHOD FOR MULTISTAGE ELECTRICAL SIGNAL PROCESSING

FIELD OF THE INVENTION

The invention relates to multistage electrical signal processing apparatus and particularly to such apparatus having processing elements distributed across a plurality of devices interconnected to form a cascaded array.

BACKGROUND OF THE INVENTION

Electrical signal processing apparatus including apparatus for analyzing multi bit binary coded ditital signals, is known including devices where a number of processing elements are provided on a single chip device such as an integrated circuit silicon chip. Such apparatus may require high speed sampling of data and difficulties arise when it is necessary to interconnect a number of such devices or chips in order to form a cascaded array. Electrical signals can be transferred more quickly in on-chip communication than off-chip communication which is necessary when data is communicated through a number of interconnected chips. Due to the small physical size of integrated circuits chips limited space is available for output and input pins to effect interchip connections and this can raise further difficulties in attempting to overcome slower off-chip communication in synchronous systolic arrays of processing elements partitioned across multiple devices when they are arranged to effect high frequency data sampling.

It is an object of the present invention to provide multistage electrical signal processing apparatus with improved inter device connection for use in synchronous systolic arrays having processing elements distributed across a plurality of devices.

SUMMARY OF THE INVENTION

The present invention provides multistage electrical signal processing apparatus comprising a plurality of signal processing elements distributed across a plurality of devices interconnected to form a cascaded array of devices, data supply means for inputting time varying input data to each of the processing elements, the same input data being supplied simultaneously to each of the devices, each device comprising:

(1) at least one signal processing element, (2) means for generating an intermediate result representing the result of processing the input data received by that device after a time interval from input of the data, (3) interconnecting means arranged to supply to a second device an output from a first device for combination with said intermediate result of said second device, (4) combining means for combining any output received through said interconnecting means with said intermediate result to form a combined result, and (5) output means for outputting said combined result from the device through said interconnecting means, said interconnecting means including signal delay means whereby said intermediate result in a second device is combined with an output which was derived from a first device at a time related to that at which input data was input to said second device for use in forming said intermediate result, and (6) time control means controlling the time at which data is input to each of the elements and controlling a time interval between input of data to a said device and the formation of an intermediate result using that data.

Preferably the apparatus includes means for updating the input data supplied to each of the elements in a succession of time controlled cycles so as to form in each device a new intermediate result in each cycle, said time delay means being arranged to introduce a time delay such that the intermediate result of a second device which is combined with the output of a first device is the intermediate result obtained from input data input to the second device during the cycle immediately following that of the formation of the intermediate result incorporated in the output of the first device.

Preferably each device includes means effecting further time delay connected to said combining means and arranged to introduce a controlled time delay between generation of a said intermediate result by the element or elements or the device and the output of a combined result from the device thereby forming a time controlled pipeline in which combined outputs are output from the device at a frequency equal to that of said intermediate result formation but delayed by a controlled time delay.

Conveniently the combining means comprise adding devices for adding the output of one device to a said intermediate result of another device. Alternatively other devices such as shifters, multipliers, or logical bit operators may be used as the combining means.

The invention is particularly applicable to processing apparatus in which said elements each comprise adding devices connected in a chain and arranged to effect addition using input data and accumulation with an output from a preceding element. Each device may have a plurality of elements each comprising adding devices connected in a chain and each arranged to effect multiplication of input data with a coefficient and to accumulate the result of the multiplication with data output by a preceding element in the chain.

In such apparatus arranged to handle multi bit binary coded digital signals, the number of bits needed to represent the accumulated output of a succession of devices may increase as the number of devices included in the array increases. It may therefore be desirable to output from each device to the next fewer bits than are used to represent the accumulated output of the said device.

In such an arrangement, the elements are arranged to process multi bit binary coded ditital signals, each device including selector means for selecting from said intermediate results a signal formed by less bits than the multi bit signal processed by each element.

Conveniently adjacent devices in the cascaded array are interconnected by a multi bit parallel connection, said connection having a bit width with less bits than the multi bit signals processed by each element.

The invention is particularly applicable to a transversal filter for effecting electrical signal analysis, said filter comprising a cascaded array of separate filter devices. Each such device may comprise a single silicon chip.

BRIEF DESCRIPTION OF THE DRAWINGS

FIG. 5 illustrates in more detail the interconnection of two devices as shown in FIG. 4.

DESCRIPTION OF THE PREFERRED EMBODIMENTS

This particular example relates to digital transversal filters in which a synchronous systolic array is formed by interconnecting a plurality of single integrated circuit chip devices, each chip having N stages of filtering. Each stage of the filter is arranged to multiply input data, which in this example is represented by a 16 bit number, by a stage coefficient which in this example is represented by a further 16 bit number. Each stage effects this multiplication in a time controlled major cycle consisting of a plurality of minor cycles, each minor cycle involving the formation of a partial product and addition with any previous partial products of that major cycle. The input data is fed simultaneously to all devices and to all stages on each device. The input data is updated each major cycle. The major cycle has a time T and after each major cycle the output of each stage is fed to the next stage on the same chip and a new product calculation is commenced using new updated input data. The output of the filter chain at time t=kT is given by:

$$y[kT] = w(1)*x[kT] + w(2)*x[(k-1)T] + \ldots + w(N)*x[(k-N+1)T]$$

where x[kT] represents the kth input data sample and w(1) to w(N) are the weight coefficients for the N stages.

Figure 1:
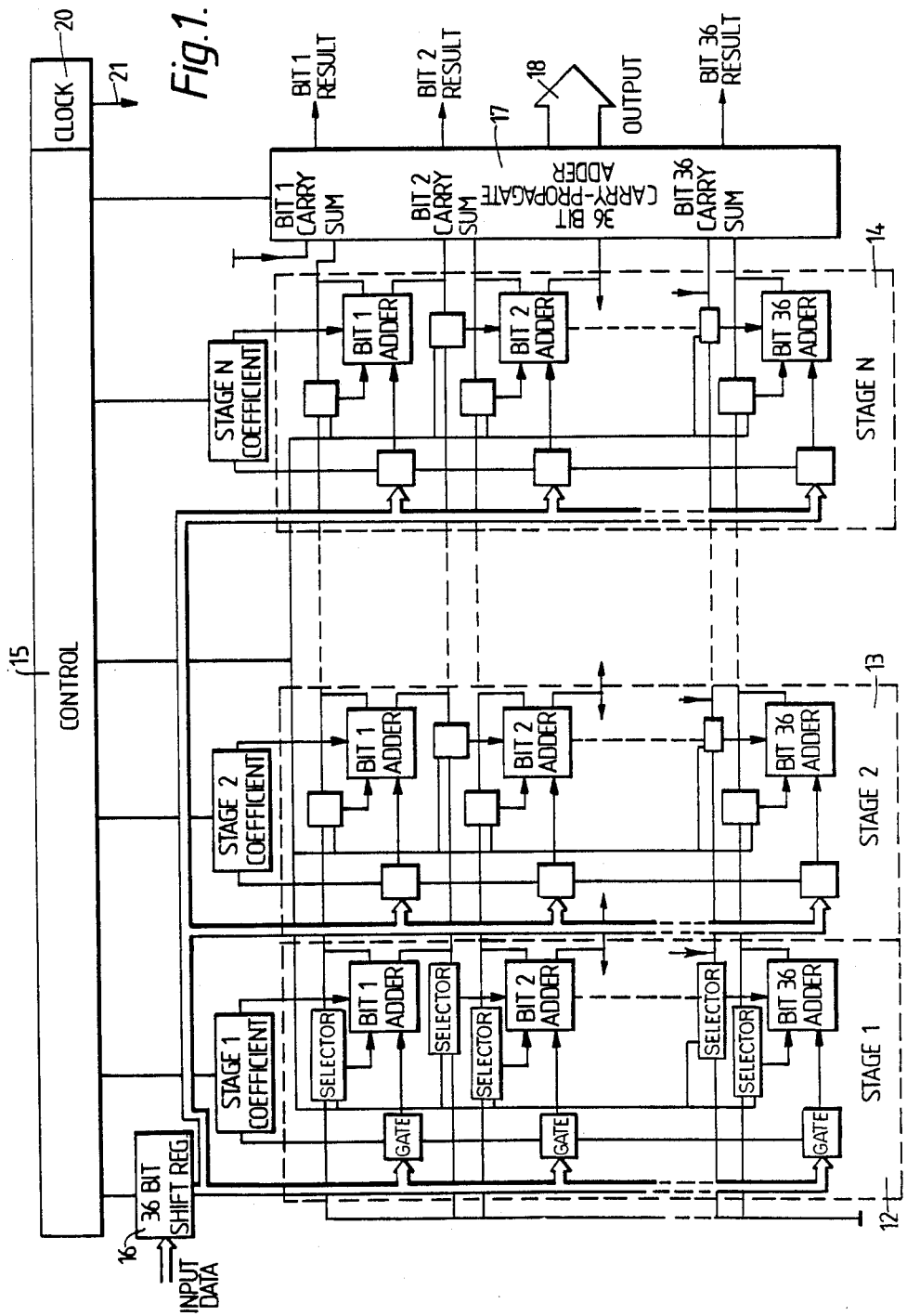
FIG. 1 is a block diagram of one device for use in a transversal filter for analysis of multi bit binary coded digital signals.

The arrangements shown in FIG. 1 is provided on a single chip and in this example consists of thirty two successive stages of which only the first two stages 12 and 13 and the final stage 14 have been marked. The operation of each stage is carried out under the control of a control unit 15 using input data derived from an input shift register 16. Each stage includes thirty six bit locations each having an adder for use in forming and accumulating partial products for each minor cycle. The adders in each stage need not complete resolution of any carry signals during each major cycle. Each stage forwards a sum and carry signal to the next stage after completion of each major cycle and the last stage 14 provides an output consisting of sum and carry signals for each bit position to a carry propagate adder 17. This adder completes resolution of any carry signals and provides a thirty six bit output signal 18 herein referred to as an intermediate result for that chip. The device illustrated in FIG. 1 is fully described and claimed in our copending patent application filed May 19, 1987 entitled "Improvements in or relating to multistage digital signal multiplication and addition" U.S. Ser. No. 052249. It will not be further described in this specification as the contents of that copending application are hereby incorporated by cross reference.

Figure 2:
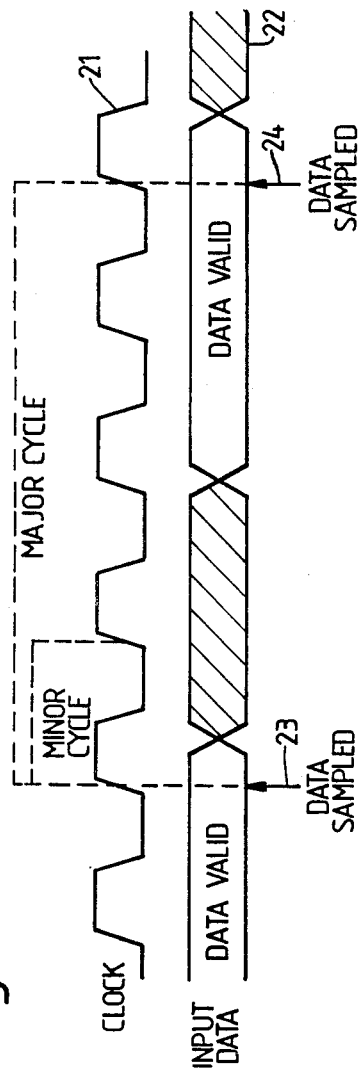
FIG. 2 illustrates timing diagrams for use in the apparatus of FIG. 1.

The timing operation can be seen from reference to FIG. 2 which illustrates a clock pulse train 21 derived from a clock 20 and in the examples shown one clock pulse is required for each minor cycle used in partial product formation. In this example each major cycle consists of four successive clock pulses which would be appropriate for a four or eight bit coefficient. The input data supplied into the shift register 16 is illustrated at 22 and this may incorporate a signal to indicate periods when the data is valid and may properly be sampled. The device of FIG. 1 is arranged to sample input data on a rising edge of a clock pulse so that data for two successive major cycles is sampled at the instances marked 23 and 24 in FIG. 2.

Figure 3:
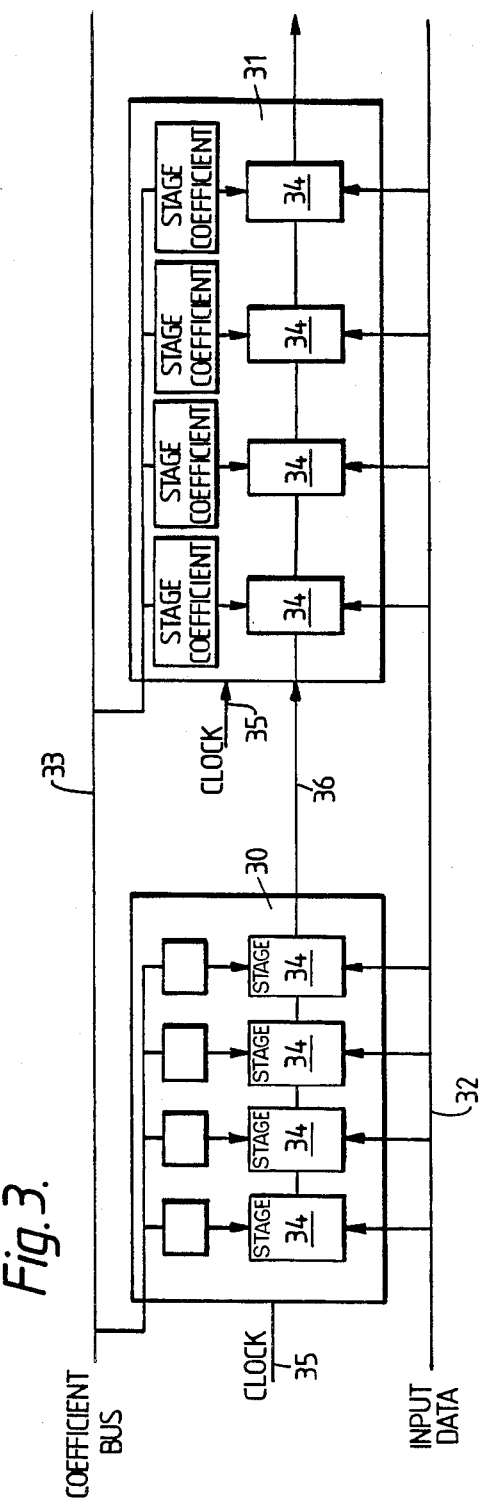
FIG. 3 illustrates a cascade connection not in accordance with the present invention.

If the number of filter stages provided on a single chip of the type illustrated in FIG. 1 are not sufficient for some signal analysis purposes, it may be desirable to interconnect a succession of chips to form a cascaded array. Such a cascade is illustrated in FIG. 3 although this example is not in accordance with the invention. This illustrates two successive chips 30 and 31 each arranged to receive the same input data from a bus 32 together with coefficients from a bus 33. Each device incorporates a plurality of stages 34 and the operation of each is controlled by a common clock giving clock pulse inputs 35. Such devices may be arranged to operate at particularly high speed. For example the input data may be cycled at frequencies up to 10 MHz. Signal transfer is effected much more quickly in on-chip communication than in off-chip communication. In the example illustrated in FIG. 3 each stage on any one chip is connected to the next stage by high speed on-chip connections but the output of the last stage on device 30 is connected directly to an input to the first stage 34 on chip 31 by an external off-chip connection 36. This off-chip connection 36 will be a multi bit parallel connection depending on the bit width of the output signal to be conveyed from each chip to the next. It will inevitably be slower than the on-chip communication and in high speed operation will not be possible for the output from the device 30 to be received for processing by the first stage 34 of the second device 31 in synchronism with a major cycle of operation on device 31 following immediately after the previous major cycle in which the last stage on device 30 formed an output. This unavoidable delay in line 36 would mean introducing some form of delay into the input data line 32 which would therefore require additional input pins on each device to receive the delayed output from the delay device in the input data bus 32. Furthermore, the necessary number of bits in the interchip connection 36 will require an extra bit for each doubling in the number of filter stages 34 which are involved in the cascaded array. To avoid the problem of providing an excessively large number of input and output pins on the limited space available on an integrated circuit chip, it is preferable to select a rounded output from each chip using a selected number of most significant bits so that the output conveyed from each chip to the next is independent of the cascaded array length. In order to produce a rounded output from the device 30 this means using an adder similar to the adder 17 in FIG. 1 in order to resolve the carry signals and then using a bit selector to select a limited number of bits and effecting rounding before transmitting the output through the interconnection 36. These operations introduce further delay which must have some delay compensation in the data line 32 if the interconnection 36 is to lead directly into the input of the first filter stage on the second device 31. Furthermore, if only a selected number of bits are transmitted along the interconnection 36 it will be necessary to provide a further selector at the input to each successive stage so that the selected number of bits are fed to the correct bit locations of the first filter stage on the next chip. It also has the disadvantage of less accuracy in that each filter stage of the second chip operates with rounded data before producing its own output.

Figure 4:
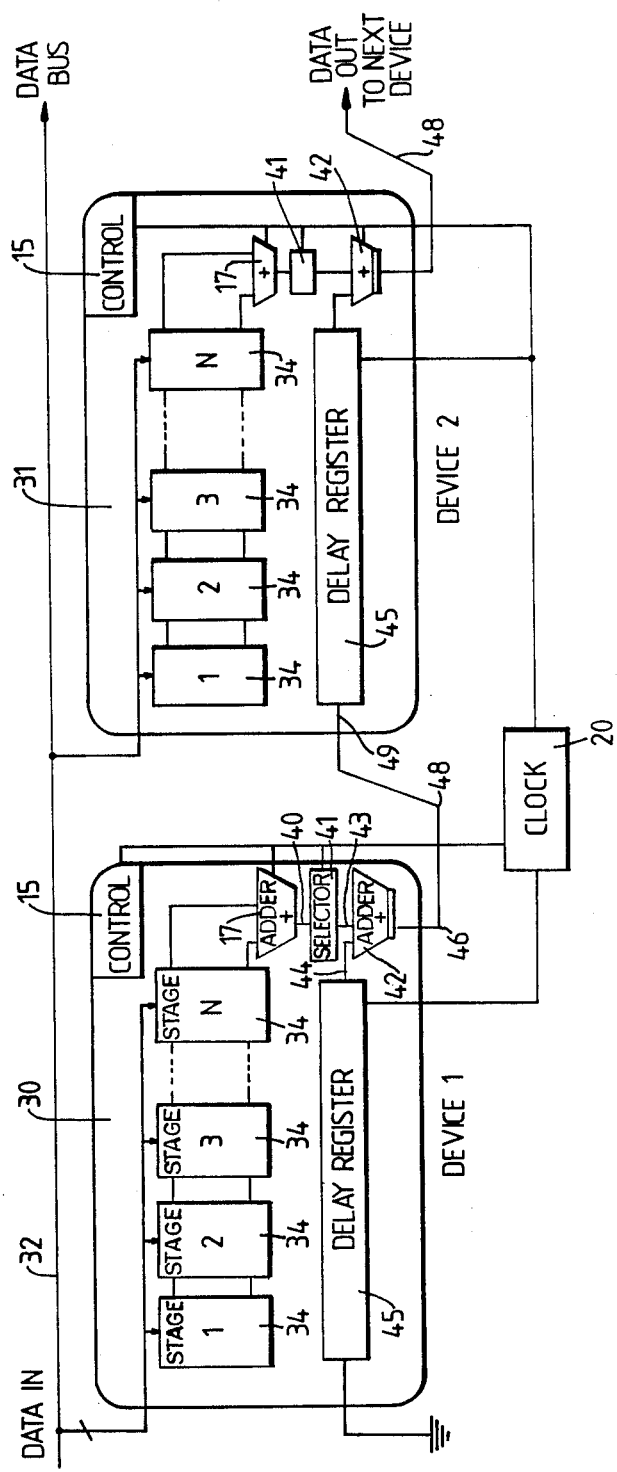
FIG. 4 illustrates a cascade connection between devices of the type shown in FIG. 1 and in accordance with the present invention.

FIG. 4 shows a modification of the cascaded arrangement which is in accordance with the present invention. Each chip in this example comprises a CMOS chip having N stages of filter each stage being marked 34. The filter stages are controlled by a control unit 15 using a timing clock 20 as previously described with reference to FIG. 1. An intermediate result 18 (FIG. 1) is formed for each device by the adder 17. The output 40 from the adder 17 is fed to a selector and rounder 41 before reaching a combination device in the form of a carry propagate adder 42. The adder 42 combines the output 43 from the selector 41 with the output 44 from a delay shift register 45. The adders 17 and 42 as well as the selector 41 and shift register 45 are controlled by the clock 20. The adder 42 provides a combined output 46 which is fed through a multi bit parallel data path 48 to the input 49 of the next device in the cascade. The input 49 is connected to the input of the delay shift register 45 in the next device.

The connection between the two devices is illustrated more fully in FIG. 5 which shows the output part of a device 30 and the input part of device 31. In this example FIG. 5 uses a notation on the data buses showing the bit width of the data paths. The DATAIN line 32 provides a 16 bit signal to the filter stages and the output of the last filter stage 34 on each device is a thirty six bit signal fed to the adder 17. The intermediate result from the adder 17 is formed on line 40 which in this example is still a thirty six bit signal. The selector 41 selects the most significant twenty one bits and has a carry in from the most significant discarded bit so that rounding is achieved. It provides an output on line 43 which is a twenty four bit signal and the most significant three bit locations have sign extension so as to contain the same bits as the most significant bit of the twenty one selected bits. This allows the apparatus to operate in twos complement in order to handle negative numbers. The twenty four bit signal on line 43 is fed to the adder 42 where the signal is combined with any output on line 44 from the delay register 45. The signal on line 44 is also a twenty four bit signal and a twenty four bit output is provided on line 48 which interconnects the output of the first device 30 to the input of the delay register 45 on the second device 31. It will therefore be seen that the signal which forms the combined output from any one device is fed along line 48 through the delay register 45 on the next device so that it is combined with the intermediate output of the next device in the cascaded array.

The adders 17 and 42 as well as the selector 41 will each take time to carry out their respective operations and as they are controlled by the clock 20 they are allocated an integral number of major cycles in which to operate. For this example it is assumed that the adder 17 and selector 41 introduce a delay of P major cycles. The adder 42 may incorporate additional time delay illustrated at 50 so that the combined delay of operation of the adder 42 together with inherent delay in the off-chip communication 48 represents a whole number of major cycles between the adder 42 and the input to the delay register 45 on the second device. It is assumed that this collective delay between the adder 42 and the input to the shift register 45 on the next device is represented by X major cycles. If the filter provided by each chip has N stages each using one major cycle the time of processing by the N stages on each chip is N major cycles. The number of major cycles delay which is introduced by each shift register 45 is Y where X+Y=N. In this way, the combined output 46 from any one chip is joined at the adder 42 of the next chip with the intermediate result of the next chip in such a way that the two are time synchronized. The intermediate result at the second chip will have been derived using input data which was input to the second chip immediately following the last major cycle in which data was input to the first chip in forming the combined output from the first chip.

It will therefore be seen that the effect of the major cycles delay introduced by the adder 42, 50 and the interconnecting line 48 provide a pipeline effect so that a new combined output is supplied to further chips in the array at the same frequency as the production of intermediate results on each chip although it has been phase shifted by introduction of the pipeline delay.

This enables synchronism between the chips to be achieved without causing any delay in the DATAIN supply to each of the chips. It permits reduction in the number of bits transmitted through the interconnection 48 between successive chips so that less input and output pins are necessary on the restricted space available on each chip. The use of twenty four bits only twenty one of which are used prior to sign extension by the selector 41 on the first chip allows for additional bits to be included after each doubling of the number of filter stages in the cascade. By arranging for the rounded output of each stage to be combined only with the rounded output of the next stage, less inaccuracy results as the second device does not itself carry out rounding on a number which has already been rounded by a previous stage.

In the above example, the delay of P major cycles introduced by the adder 17 and selector 41 is common to each chip and need not be taken into account in determining the number of delay units to be introduced by the shift register 45.

The invention is not limited to the details of the foregoing example. For instance, if the delay of P units introduced after the last stage of each device prior to combination at the adder 42 is not common to each unit then variation in the delay achieved by the shift register 45 will be necessary to achieve synchronism of the output of one device with the intermediate result of the next device.

Although the above examples have related to single chip devices, the invention may be applied to other cascaded arrays including those formed by use of board devices. Although the particular example given relates to transfersal filters, other signal processing devices or other arrays may be used.

What is claimed is:

1. Multistage electrical signal processing apparatus comprising a plurality of signal processing elements distributed across a plurality of devices interconnected to form a cascaded array of devices, a data supply means for inputting time varying input data to each of the processing elements, the same input data being supplied simultaneously to each of the devices, each device comprising:

(1) a signal processing element,
(2) a first combining device coupled to said signal processing element for generating an intermediate result representing the result of processing the input data received by said device after a time interval from input of the data, (3) a receiving device having an input for receiving an output from a preceding device in said cascaded array, and, (4) a second combining device coupled to said receiving device and said first combining device for combining said output with said intermediate result to form a combined result, said signal processing apparatus further including output means for outputting said combined result from one device into the receiving device of the next device in said cascaded array, each receiving device including signal delay means whereby said intermediate result in a device in said cascaded array is combined with the output which was derived from a preceding device in said cascaded array at a time related to that at which input data was input to said device for use in forming said intermediate result, said signal processing apparatus further including a time control means controlling the time at which data is input to each of the elements and controlling a time interval between input of data to each device and the formation of an intermediate result using that data.

2. Multistage electrical signal processing apparatus according to claim 1 further including means for updating the input data supplied to each of the elements in a succession of time controlled cycles so as to form in each device a new intermediate result in each cycle, said signal delay means being arranged to introduce a time delay such that the intermediate result of one said device which is combined with the output of a preceding said device in said cascaded array is the intermediate result obtained from input data which was input to said one device during the cycle immediately following that of the formation of the intermediate result incorporated in the output of said preceding device.

3. Multistage electrical signal processing apparatus according to claim 1 in which each device includes a plurality of signal processing elements connected in a sequential chain, each arranged to process input data in a succession of cycles each having a controlled time duration, whereby the said time interval to produce intermediate result for the device is dependent on the time of each cycle and on the number of elements in the device.

4. Multistage electrical signal processing apparatus according to claim 3 further including means for supplying an output from one element after a cycle to a subsequent element in the chain for use with input data by the subsequent element in a subsequent cycle, and means for updating the input data to each element in each cycle.

5. Multistage electrical signal processing apparatus according to claim 1 in which each device further includes means for effecting further time delay, said means being coupled to said second combining means and arranged to introduce a controlled time delay between generation of each said intermediate result by said signal processing element and the output of said combined result from the device thereby forming a time controlled pipeline in which combined outputs are output from the device at a frequency equal to that of said intermediate result formation but delayed by a controlled time delay.

6. Multistage electrical signal processing apparatus according to claim 5 in which said means for effecting further time delay is coupled between said second combining device and an input of a subsequent device in said cascaded array.

7. Multistage electrical signal processing apparatus according to claim 5 further including a second means for effecting a further time delay coupled between a last processing element on each device and said second combining device for the device.

8. Multistage electrical signal processing apparatus according to claim 1 in which said signal delay means is coupled between an input to each device and said second combining means.

9. Multistage electrical signal processing apparatus according to claim 1 in which said signal delay means comprises a shift register through which data is sequentially shifted to introduce a time delay, or memory with means for sequential addressing.

10. Multistage electrical signal processing apparatus according to claim 1 in which each said second combining device comprises an adding device for adding the output of one device to said intermediate result of a preceding device in said cascaded array.

11. Multistage electrical signal processing apparatus according to claim 1 wherein each device includes a plurality of signal processing elements each comprising a plurality of adding devices connected in a chain and arranged to effect addition using input data and accumulation with an output from a preceding element.

12. Multistage electrical signal processing apparatus according to claim 11 in which each signal processing element is coupled to effect multiplication of input data with a coefficient and to accumulate the result of the multiplication with data output by a preceding element in the chain.

13. Multistage electrical signal processing apparatus according to claim 12 in which each signal processing element is time controlled to effect multiplication without complete resolution of carry signals, each said device including a carry propagate adder at an output end of the chain of elements so as to provide a resolved total for the device.

14. Multistage electrical signal processing apparatus according to claim 1 in which said signal processing elements are arranged to process multi bit binary coded digital signals, each device further including a selector means for selecting from each said intermediate result a signal formed by fewer bits than the multi bit signal processed by each element.

15. Multistage electrical signal processing apparatus according to claim 14 in which adjacent devices in the cascaded array are interconnected by a multi bit parallel connection, said connection having a bit width with fewer bits than the multi bit signals processed by each element.

16. A multistage electrical signal processing apparatus according to claim 1 wherein each device comprises a single silicon chip device.

17. A method of multistage processing of electrical signals comprising inputting time varying input data to each of a plurality of signal processing elements distributed across a plurality of devices interconnected to form a cascaded array of devices, the same input data being supplied simultaneously to each of the devices, generating for each device an intermediate result representing the result of processing the input data received by that device after a time interval from input of the data, controlling the time at which data is input to each of the elements, controlling a time interval between input of data to the elements of each device and the formation of an intermediate result using that data, supplying sequentially an output from each device to a connected device in the cascaded array, the output of one device being formed by combining an output received from a connected device in the array with the intermediate result of said one device to form a combined result, and outputting said combined result from each device, said supply of an output from one device to a connected device including delaying the signal so that said intermediate result in one device is combined with an output which was derived from a connected device at a time related to that at which input data was input to said one device for use in forming the intermediate result of said one device.

18. The method of claim 17 further comprising updating input data to each of the elements in a succession of time controlled cycles so as to form in each device a new intermediate result in each cycle, and setting said time delay such that the intermediate result of one device which is combined with the output of a connected device is the intermediate result obtained from data input to the said one device during the cycle immediately following that of the formation of the intermediate result incorporated in the output of the said connected device.

19. The method of claim 17 wherein said input data is multiplied with a coefficient by effecting repeated addition in each element, and a multiplication output is formed by each element and accumulated with the multiplication output of a connected element.

* * * * *